US012627913B2

(12) United States Patent
Yin et al.

(10) Patent No.: US 12,627,913 B2
(45) Date of Patent: May 12, 2026

(54) SOUND-PRODUCING GLASSES TEMPLE STRUCTURE AND HEAD-MOUNTED DISPLAY DEVICE

(71) Applicant: GOERTEK INC., Weifang (CN)

(72) Inventors: Haijun Yin, Weifang (CN); Bin Jiang, Weifang (CN); Xiaoyu Chi, Weifang (CN)

(73) Assignee: GOERTEK INC., Weifang (CN)

( * ) Notice: Subject to any disclaimer, the term of this patent is extended or adjusted under 35 U.S.C. 154(b) by 90 days.

(21) Appl. No.: 18/557,389

(22) PCT Filed: Nov. 1, 2021

(86) PCT No.: PCT/CN2021/127815
§ 371 (c)(1),
(2) Date: Oct. 26, 2023

(87) PCT Pub. No.: WO2022/227465
PCT Pub. Date: Nov. 3, 2022

(65) Prior Publication Data
US 2024/0205575 A1 Jun. 20, 2024

(30) Foreign Application Priority Data

Apr. 27, 2021 (CN) .......................... 202110462316.2

(51) Int. Cl.
*H04R 1/02* (2006.01)
*G02B 27/01* (2006.01)
*G02B 27/09* (2006.01)

(52) U.S. Cl.
CPC ......... *H04R 1/021* (2013.01); *G02B 27/0176* (2013.01); *G02B 27/0955* (2013.01);
(Continued)

(58) Field of Classification Search
CPC .... H04R 1/021; H04R 1/026; H04R 2499/15; G02B 27/0176; G02B 27/0955; G02B 2027/0178
See application file for complete search history.

(56) References Cited

U.S. PATENT DOCUMENTS

2015/0172796 A1* 6/2015 Chao ................. B29C 45/14008
381/332
2015/0268475 A1 9/2015 Lee et al.
(Continued)

FOREIGN PATENT DOCUMENTS

CN 103763667 A 4/2014
CN 105721973 A 6/2016
(Continued)

OTHER PUBLICATIONS

Machine translation of CN106507253A (Year: 2017).*
(Continued)

*Primary Examiner* — Andrew Sniezek
(74) *Attorney, Agent, or Firm* — Shih IP Law Group, PLLC

(57) ABSTRACT

A sound-producing glasses temple structure and a head-mounted wearable device, the sound-producing glasses temple structure including a glasses temple housing having an accommodating space, and a deformation sleeve and a sound-producing device disposed in the glasses temple housing, wherein the deformation sleeve wraps an outer surface of the sound-producing device, and the deformation sleeve abuts the glasses temple housing and the sound-producing device and is disposed between the glasses temple housing and the sound-producing device so that the sound-producing device is fixedly suspend in the accommodating space. The sound-producing glasses temple structure can
(Continued)

100 effectively prevent abnormal sound that is not produced by the vibration of the sound-producing device.

9 Claims, 7 Drawing Sheets

(52) U.S. Cl.
CPC ..... *H04R 1/026* (2013.01); *G02B 2027/0178* (2013.01); *H04R 2499/15* (2013.01)

(56) References Cited

U.S. PATENT DOCUMENTS

| | | | |
|---|---|---|---|
| 2016/0055822 A1* | 2/2016 | Bell ..................... | G02B 27/017 345/207 |
| 2017/0195775 A1 | 7/2017 | Morris et al. | |
| 2018/0048747 A1 | 2/2018 | Kang et al. | |
| 2020/0092633 A1 | 3/2020 | Zhang et al. | |
| 2020/0292907 A1* | 9/2020 | Wang ..................... | G02C 7/101 |

FOREIGN PATENT DOCUMENTS

| | | | | |
|---|---|---|---|---|
| CN | 106507253 | A | | 3/2017 |
| CN | 109068248 | A | | 12/2018 |
| CN | 110119037 | A | | 8/2019 |
| CN | 209842240 | U | | 12/2019 |
| CN | 210629828 | U | * | 5/2020 |
| CN | 212229363 | U | | 12/2020 |
| CN | 112255803 | A | | 1/2021 |
| CN | 113296263 | A | | 8/2021 |
| CN | 214504028 | U | | 10/2021 |
| CN | 214507326 | U | | 10/2021 |

OTHER PUBLICATIONS

Machine translation of CN210629828U (Year: 2020).*
International Search Report from International Application No. PCT/CN2021/127815 mailed Jan. 25, 2022.

* cited by examiner

100

SOUND-PRODUCING GLASSES TEMPLE STRUCTURE AND HEAD-MOUNTED DISPLAY DEVICE

The present disclosure claims the priority to the Chinese Patent Application No. 202110462316.2, entitled "SOUND-PRODUCING GLASSES TEMPLE STRUCTURE AND HEAD-MOUNTED DISPLAY DEVICE" filed to China Patent Office on Apr. 27, 2021, the entire contents of which are incorporated into the present disclosure by reference.

TECHNICAL FIELD

The present disclosure relates to a technical field of electro-acoustic conversion, and more particularly, to a sound-producing glasses temple structure and a head-mounted display device.

DESCRIPTION OF RELATED ART

A head-mounted AR device requires a loudspeaker to be placed therein for audio playback. The loudspeaker causes the surrounding comparts to vibrate while it produces sound, which may cause the surrounding components to resonate, producing noise or abnormal sound, resulting in a poor acoustic experience for users.

Therefore, it is necessary to provide a new sound-producing glasses temple structure and a head-mounted display device to solve the above technical problems.

SUMMARY

A main purpose of the present disclosure is to provide a sound-producing glasses temple structure and a head-mounted display device, aiming to solve the problems in existing head-mounted AR devices that the loudspeaker causes the surrounding components to resonate while it produces sound, and thereby producing noise or abnormal sound, resulting in a poor acoustic experience for users.

In order to achieve the above purpose, the sound-producing glasses temple structure provided by the present disclosure includes a glasses temple housing having an accommodating space, and a deformation sleeve and a sound-producing device disposed in the glasses temple housing, wherein the deformation sleeve wraps an outer surface of the sound-producing device, and the deformation sleeve abuts the glasses temple housing and the sound-producing device and is disposed between the glasses temple housing and the sound-producing device so that the sound-producing device is fixedly suspend in the accommodating space.

Optionally, the glasses temple housing is an integrally molded piece, the glasses temple housing is provided with an assembly opening disposed corresponding to the sound-producing device, and the sound-producing glasses temple structure further includes a sealing cover disposed to cover the assembly opening.

Optionally, the deformation sleeve includes a rubber sleeve and a fixing plate, the rubber sleeve is provided with a first opening and a second opening disposed opposite to each other, the fixing plate is provided at the first opening, the sound-producing device is provided with a diaphragm facing the second opening, and an end of the sound-producing device away from the diaphragm is connected with the fixing plate.

Optionally, the rubber sleeve has two first side walls disposed opposite to each other and two second side walls disposed opposite to each other, and the first side walls and the second side walls are connected end to end in sequence to surround and form the first opening and the second opening, the first side walls and the second side walls wrap a side wall of the sound-producing device, and the sealing cover is disposed opposite to the first side wall.

Optionally, the glasses temple housing further includes two limiting seats provided inside the glasses temple housing, the two limiting seats are disposed opposite to each other along a long axis direction of the glasses temple housing, and the two limiting seats are abutted against the two second side walls respectively.

Optionally, the glasses temple housing includes an inner wall facing a user's head and a bottom wall facing the user's ears, the assembly opening is opened on the bottom wall, and the diaphragm of the sound-producing device is disposed to face the inner wall.

Optionally, the sealing cover includes a body portion and a waterproof net, a sound-producing front cavity is formed between the diaphragm of the sound-producing device and the inner wall, the body portion is provided with a sound outlet communicated with the sound-producing front cavity, and the waterproof net is plugged at the sound outlet.

Optionally, the waterproof net includes an assembly bracket assembled with a wall surface of the sound outlet and a mesh placed on the assembly bracket, and the mesh covers the sound outlet.

Optionally, a sound-producing rear cavity is formed between a surface for connecting the sound-producing device with the fixing plate and the glasses temple housing, the glasses temple housing is further provided with a sound leakage hole, the rubber sleeve and/or the fixing plate is provided with an airflow channel connecting the sound leakage hole and the sound-producing rear cavity, and/or a gap between the rubber sleeve and the fixing plate forms an airflow channel that connects the sound leakage hole and the sound-producing rear cavity.

The present disclosure also provides a head-mounted display device, including display module connected with the hanger, both ends of the hanger are provided with the above-mentioned sound-producing glasses temple structure; the display module includes a first glasses frame on which a first lens is mounted, and a light engine component mounted on one side or both sides of the first glasses frame and used for transmitting display content to the first lens.

Optionally, the hanger further includes a second glasses frame, both ends of the second glasses frame are connected to the sound-producing glasses temple structure, a second lens is mounted in the second glasses frame, and the second lens is a myopia lens, a photosensitive standard color lens, or an electrochromic lens.

In the present disclosure, the deformation sleeve wraps over the outer surface of the sound-producing device, thereby the deformation sleeve abuts the glasses temple housing and the sound-producing device and is disposed between the glasses temple housing and the sound-producing device, so that the sound-producing device is fixedly suspend in the accommodating space, the deformation sleeve absorbs some or all of the vibration caused by the sound-producing device by deformation, and the glasses temple housing and other components in the glasses temple housing are not affected by the vibration of the sound-producing device, thereby reducing or preventing abnormal sound to be generated from the glasses temple housing and other components in the glasses temple housing.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, drawings in the following description are merely a part of the drawings of the present disclosure, and for those of ordinary skill in the art, other drawings can also be obtained based on the structures shown in the provided drawings without any creative effort.

Figure 1:
FIG. 1 is a stereoscopic structural diagram of a sound-producing glasses temple structure according to an embodiment of the present disclosure.
Figure 1:
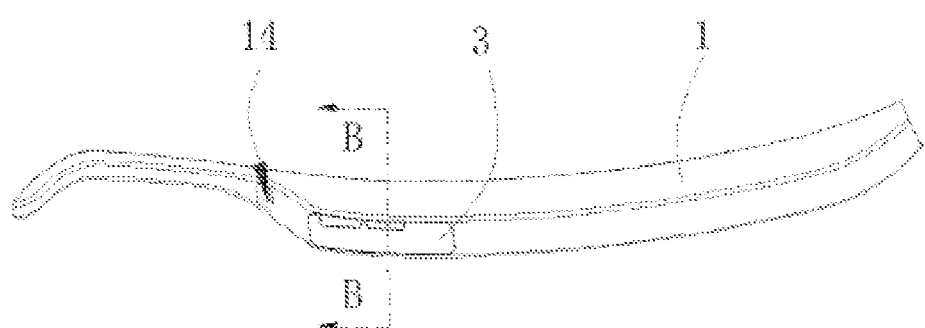

Explanation of reference numerals of the embodiments are as below:

| Reference Numeral | Name | Reference Numeral | Name |
|---|---|---|---|
| 100 | sound-producing glasses temple structure | 1 | glasses temple housing |
| 12 | assembly opening | 11 | inner wall |
| 13 | bottom wall | 14 | sound leakage hole |
| 15 | limiting seat | 3 | sealing cover |
| 31 | body portion | 32 | sound outlet |
| 33 | waterproof net | 5 | deformation sleeve |
| 51 | rubber sleeve | 511 | first side wall |
| 512 | first opening | 513 | second side wall |
| 514 | second opening | 515 | bottom wall |
| 517 | upper wall | 52 | gap |
| 53 | fixing plate | 54 | airflow channel |
| 7 | sound-producing device | 71 | diaphragm |
| 72 | sound-producing rear cavity | 74 | sound-producing front cavity |
| 20 | hanger | 40 | display module |
| 41 | first glasses frame | 43 | light engine component |

The realization of purposes, functional features and advantages of the present disclosure will be further described in conjunction with the embodiments and with reference to the accompanying drawings.

DETAILED DESCRIPTIONS

Technical solutions of embodiments of the present disclosure will be clearly and completely described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

It should be noted that all directional indications (such as up, down, left, right, front, back . . . ) in the embodiments of the present disclosure are only used to explain the relative positional relationships and movement conditions, etc. among the components in a specific posture (as shown in the accompanying drawings), and if the specific posture changes, the directional indication will also be changed accordingly.

In addition, "first", "second", etc. in the present disclosure are only for descriptive purposes, and should not be construed as indicating or implying their relative importance or implicitly indicating the quantity of indicated technical features. Thus, the features defined with "first", "second", etc. may explicitly or implicitly include at least one of these features. In addition, technical solutions of various embodiments of the present disclosure can be combined with each other, but it should be based on the fact that the technical solutions can be realized by those skilled in the art. When the combination of technical solutions is contradictory or cannot be realized, it should be considered that the combination does not exist and is not within the scope of protection required by the present disclosure.

The present disclosure provides a sound-producing glasses temple structure.

Figure 2:
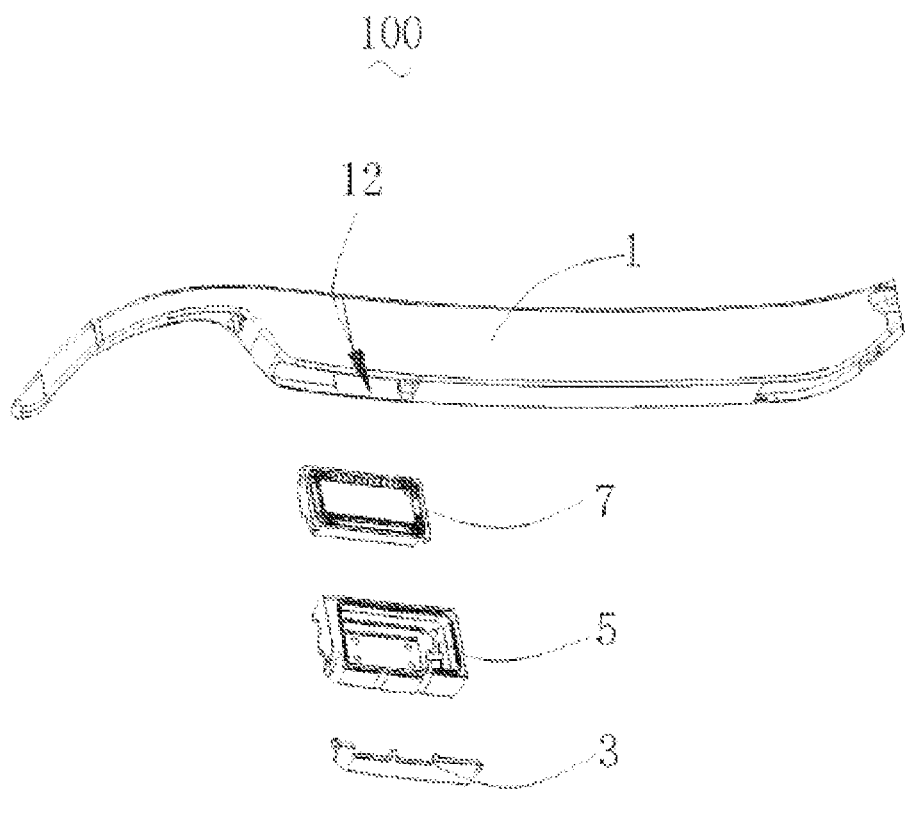
FIG. 2 is an disassembled structural diagram of the sound-producing glasses temple structure according to an embodiment of the present disclosure.
Figure 3:
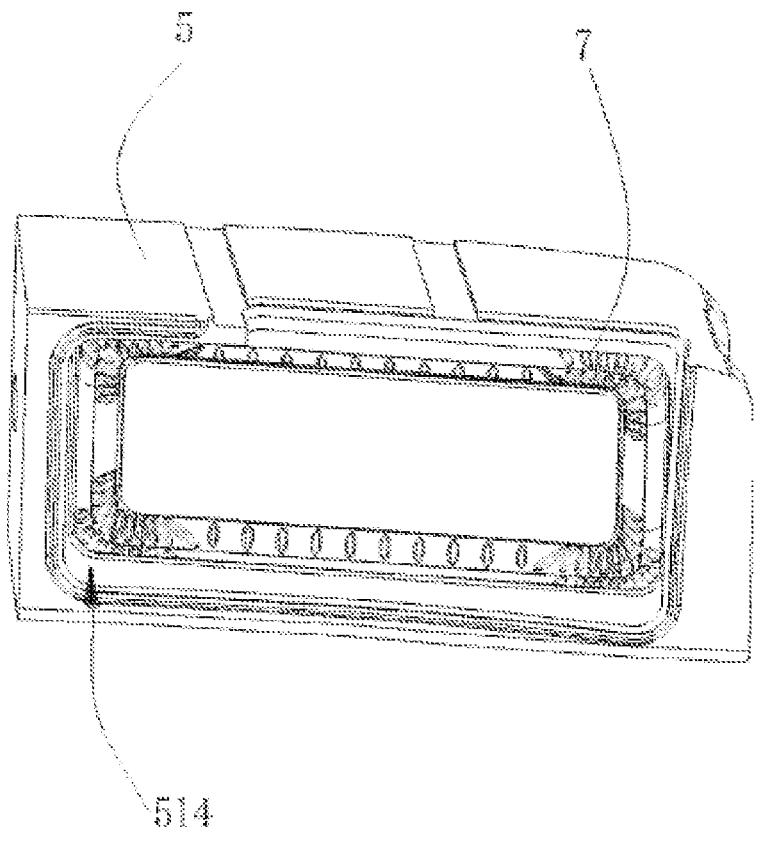
FIG. 3 is an assembly structural diagram of a deformation sleeve and a sound-producing device according to an embodiment of the present disclosure.

Referring to FIGS. 1-3, the technical solution of the present disclosure proposes a sound-producing glasses temple structure 100. The sound-producing glasses temple structure 100 includes a glasses temple housing 1 having an accommodating space, and a deformation sleeve 5 and a sound-producing device 7 disposed in the glasses temple housing 1, wherein the deformation sleeve 5 wraps an outer surface of the sound-producing device 7, and the deformation sleeve 5 abuts the glasses temple housing 1 and the sound-producing device 7 and is disposed between the glasses temple housing 1 and the sound-producing device 7 so that the sound-producing device 7 is fixedly suspend in the accommodating space.

Figure 6:
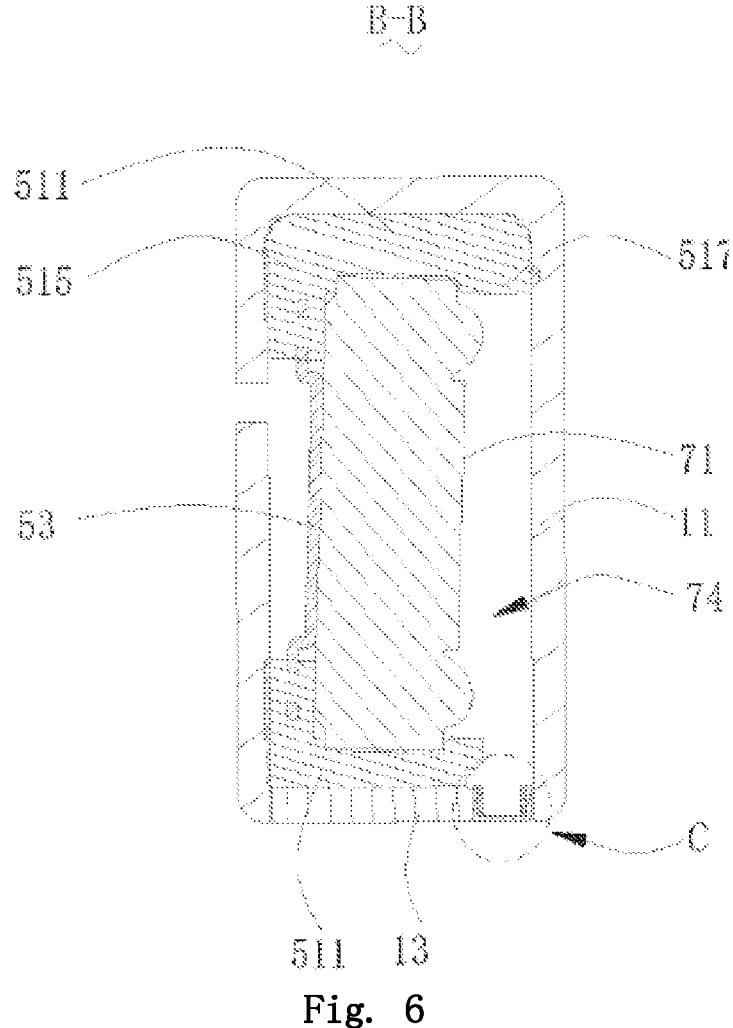
FIG. 6 is a cross-sectional structural diagram of the sound-producing glasses temple structure illustrated in FIG. 1 taken along line B-B.

Referring to FIG. 6 together, the sound-producing device 7 includes a vibration system and a magnetic circuit system having a magnetic gap. The vibration system includes a diaphragm 71 and a voice coil (not shown) that supports the vibration of the diaphragm 71, the voice coil is electrically connected to an external circuit, and when the voice coil is energized, the voice coil vibrates under the effect of a magnetic field generated by the magnetic circuit system, thereby driving the diaphragm 71 to vibrate and produce sound. The sound-producing glasses temple structure 100 is configured to assemble and form a head-mounted wearable device, and the wearable device may be an AR (Augmented Reality) device. The sound-producing glasses temple structure 100 is configured to support the head-mounted wearable device on user's head. The sound-producing glasses temple structure 100 may further include a battery, a communication module, a microphone, a touch module, etc. provided in the glasses temple housing 1.

The deformation sleeve 5 is made of soft material, and the soft material may be silicone, rubber, etc. During assembly, the sound-producing device 7 is assembled in the deformation sleeve 5, and then the sound-producing device 7 wrapped with the deformation sleeve 5 is assembled in the glasses temple housing 1. During the assembly process, the deformation sleeve 5 undergoes certain deformation after pressed by external force from the glasses temple housing 1 to adapt to the structure of the glasses temple housing 1, so that the sound-producing device 7 is suspended in the accommodating space by the deformation sleeve 5. When the sound-producing device 7 vibrates to produce sound, the deformation sleeve 5 absorbs part or all of the vibration through deformation, so that the glasses temple housing 1 and other components in the glasses temple housing 1 are not affected by the vibration of the sound-producing device 7, thereby reducing or preventing abnormal sound from the glasses temple housing 1 and other components in the glasses temple housing 1. In an embodiment, the sound-producing device 7 is completely wrapped in the deformation sleeve 5, and the diaphragm 71 of the sound-producing device 7 separates a cavity in the deformation sleeve 5 into a front cavity and a rear cavity, and only the deformation sleeve 5a is provided with a sound output channel to communicate with the front cavity. In the embodiment shown in FIG. 2, the deformation sleeve 5 only wraps the side wall of the sound-producing device 7 so that the diaphragm 71 is exposed from an opening of the deformation sleeve 5.

In the present disclosure, the deformation sleeve 5 wraps the outer surface of the sound-producing device 7, so that the deformation sleeve 5 abut between the glasses temple housing 1 and the sound-producing device 7, thereby the sound-producing device 7 is fixedly suspend in the accommodating space, and the deformation sleeve 5 absorbs part or all of the vibration caused by the sound-producing device 7 by deformation, and the glasses temple housing 1 and other components in the glasses temple housing 1 are not affected by the vibration of the sound-producing device 7, thereby reducing or preventing abnormal sound from the glasses temple housing 1 and other components in the glasses temple housing 1.

Further, the glasses temple housing 1 is an integrally molded piece, the glasses temple housing 1 is provided with an assembly opening 12 disposed opposite to the sound-producing device 7, and the sound-producing glasses temple structure 100 further includes a sealing cover 2 covering the assembly opening 12. The deformation sleeve 5 in which the sound-producing device 7 is assembled is placed into the glasses temple housing 1 through the assembly opening 12. In the present embodiment, the deformation sleeve 5 is formed into a shape that matches with the glasses temple housing 1 so that the deformation sleeve 5 is engaged in the glasses temple housing 1 by deformation. Of course, glue, snapping structures, etc. can also be provided to fix the deformation sleeve 5 in the glasses temple housing 1. The sealing cover 3 may be attached to the assembly opening 12 by applying adhesive, or may be engaged with the glasses temple housing 1 by providing an engagement structure. By configuring the glasses temple housing 1 into an integrally molded piece, the sound-producing glasses temple structure 100 may have a beautiful appearance, and in order for having a consistent appearance, the glasses temple housing 1 and the sealing cover 3 may be of the same color.

Figure 7:
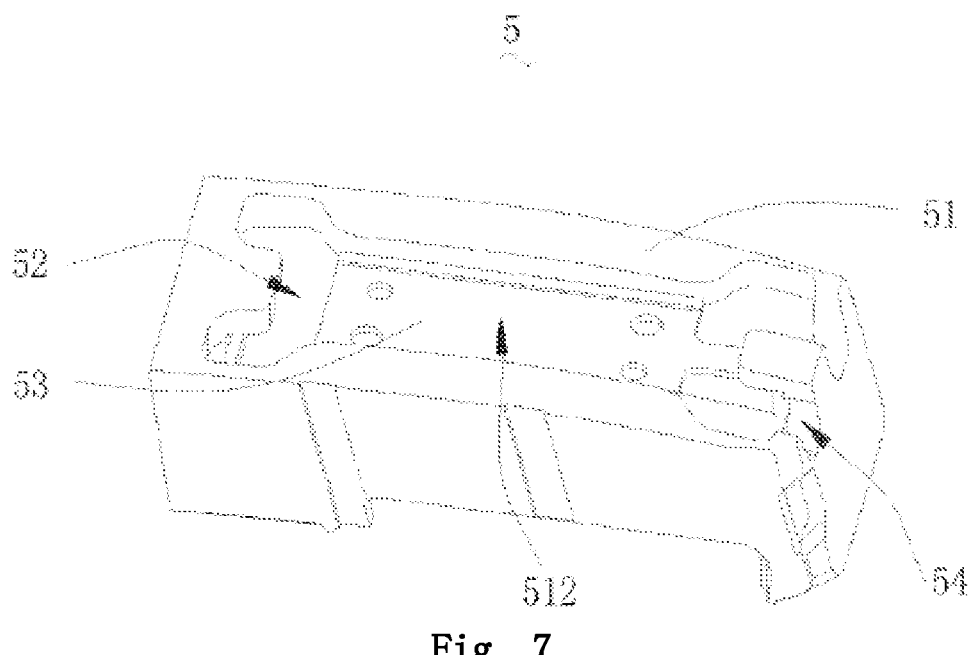
FIG. 7 is a stereoscopic structural diagram of the deformation sleeve according to an embodiment of the present disclosure.

Referring to FIG. 3 and FIG. 6, FIG. 7, the deformation sleeve 5 includes a rubber sleeve 51 and a fixing plate 53, the rubber sleeve 51 is provided with a first opening 512 and a second opening 514 disposed opposite to each other, the fixing plate 53 is provided at the first opening 512, the diaphragm 71 of the sound-producing device 7 faces the second opening 514, and an end of the sound-producing device 7 away from the diaphragm 71 is connected with the fixing plate 53, so that the sound-producing device 7 can be stably fixed in the rubber sleeve 51.

In an embodiment, an edge of the fixing plate 53 is embedded in the rubber sleeve 51, and the sound-producing device 7 is attached or adsorbed to the fixing plate 53. The fixing plate 53 is a metal fixing plate 53, and the sound-producing device 7 is magnetically adsorbed to the fixing plate 53. The edge of the fixing plate 53 is provided with a plurality of through holes, and the edge of the fixing plate 53 is embedded in the rubber sleeve 51 through injection molding process. During the injection molding process, the through holes can realize the positioning of the processing equipment, in the meanwhile the injection molding material is filled into the through holes, and after the injection molding material is solidified, the injection molding material located in the through hole can strengthen the stability of the connection between the fixing plate 53 and the rubber sleeve 51.

Figure 4:
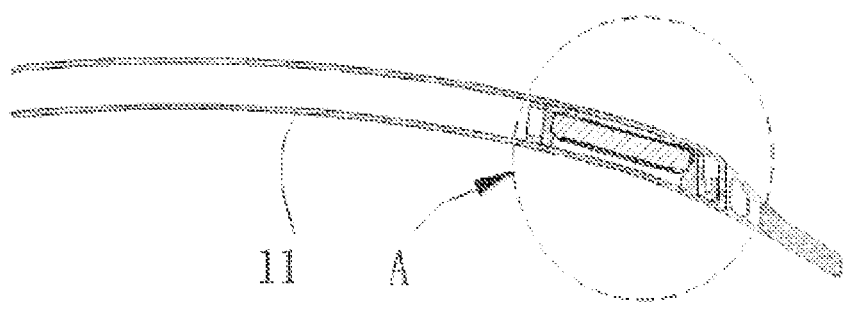
FIG. 4 is a cross-sectional structural diagram of the sound-producing glasses temple structure according to an embodiment of the present disclosure.
Figure 5:
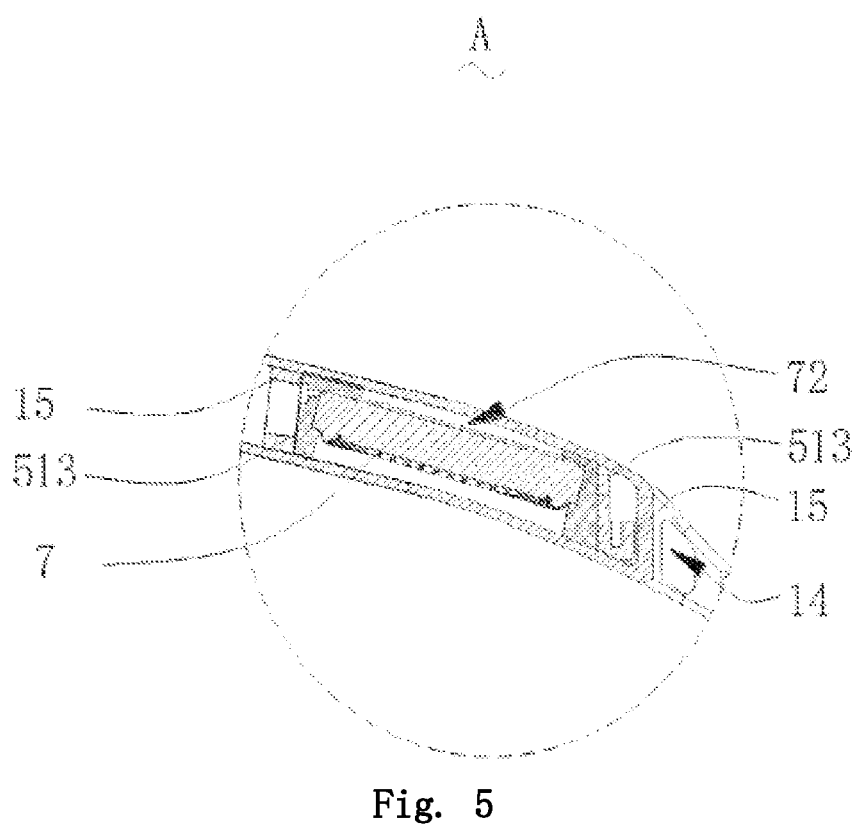
FIG. 5 is an enlarged structural schematic diagram of part A of the sound-producing glasses temple structure illustrated in FIG. 4.

Referring to FIGS. 4-6 together, the rubber sleeve 51 has two first side walls 511 disposed opposite to each other and two second side walls 513 disposed opposite to each other, and the first side walls 511 and the second side walls 513 are connected end to end in sequence to surround and form the first opening 512 and the second opening 514, the first side walls 511 and the second side walls 513 wrap over a side wall of the sound-producing device 7, and the sealing cover 3 is disposed opposite to the first side wall 511. In the present embodiment, the first side wall 511 and the second side wall 513 are connected in sequence to surround the side wall of the sound-producing device 7, so as to fix four surfaces of the sound-producing device 7. A bottom wall 515 is formed by extending an end of the first side wall 511 and the second side wall 513 adjacent to the first opening 512. The edge of the fixing plate 53 is connected to the bottom wall 515, so that the end of the sound-producing device 7 away from the diaphragm 71 can be connected to the fixing plate 53 and the bottom wall 515 at the same time, thereby the rubber sleeve 51 can fix five surfaces of the sound-producing device 7. Furthermore, a top wall 517 is formed by extending an end of the first side wall 511 and the second side wall 513 adjacent to the second opening 514. The end of the sound-producing device 7 provided with the diaphragm 71 can be connected to the top wall 517, so that the rubber sleeve 51 can fix six surfaces of the sound-producing device 7, to ensure that the sound-producing device 7 has a stable position in the rubber sleeve 51.

The sound-producing glasses temple structure 100 further includes two limiting seats 15 provided inside the glasses temple housing 1, the two limiting seats 15 are oppositely arranged in a long axis direction of the glasses temple housing 1, and the two limiting seats 15 are respectively abutted to the two second side walls 513. A space between the two limiting seats 15 is communicated with the assembly opening 12, so that when the rubber sleeve 51 which wraps the sound-producing device 7 is assembled, the rubber sleeve 51 can be directly placed between the two limiting seats 15 through the assembly opening 12, thus the limiting seats 15 abut the second side walls 513. Taking a vibration direction of the diaphragm 71 as a height direction of the sound-producing device 7, and generally, in order to ensure the loudness of the sound-producing device 7, the diaphragm 71 needs to be formed large enough, the size of the diaphragm 71 determines the length and width of the sound-producing device 7, so that the sound-producing device 7 is a rectangular or cylindrical body whose length and width are significantly greater than height. The long axis direction of the glasses temple housing 1 is perpendicular to the vibration direction of the diaphragm 71, so that when assembling the sound-producing device 7, the sound-producing device 7 may be assembled into the accommodating space in a direction parallel to a plane where the diaphragm 71 is located, and accordingly, the size of the assembly opening 12 only needs to be adapted to a certain side wall of the sound-producing device 7, thereby reducing the size of the assembly opening 12.

The size of the assembly opening 12 matches that of the deformation sleeve 5, so that the deformation sleeve 5 which wraps the sound-producing device 7 is placed in the device accommodating space after deformation through the assembly opening 12. In order to ensure a stable positional relationship between the glasses temple housing and the deformation sleeve 5, the structure and size of the deformation sleeve 5 are adapted to the accommodating space of the glasses temple housing, so that the deformation sleeve 5 can directly pass through the assembly opening 12, in the meanwhile, the deformation sleeve 5 is interference-fitted inside the glasses temple housing. The size of the assembly opening 12 matches that of the deformation sleeve 5, so that the assembly opening 12 is small enough, thereby improving the appearance consistency of the sound-producing glasses temple structure 100.

The glasses temple housing 1 includes an inner wall 11 facing a user's head and a bottom wall 13 facing the user's ears, the assembly opening 12 is provided on the bottom wall 13, and the diaphragm 71 of the sound-producing device 7 is disposed to face the inner wall 11. During the use of the sound-producing glasses temple structure 100, the sound-producing glasses temple structure 100 is placed between the user's ears and head, so that the inner wall 11 is in contact with the user's head and the bottom wall 13 is in contact with the user's ear. The diaphragm 71 of the sound-producing device 7 is disposed to face the inner wall 11, so that the sound produced by the sound-producing device 7 is closer to the user, the vibration and sound production of the diaphragm 71 can be effectively transmitted to the user. The assembly opening 12 is provided on the bottom wall 13, thereby when the user wears the sound-producing glasses temple structure 100, the sealing cover 3 can be hidden so that the exposed appearance is consistent.

Figure 8:
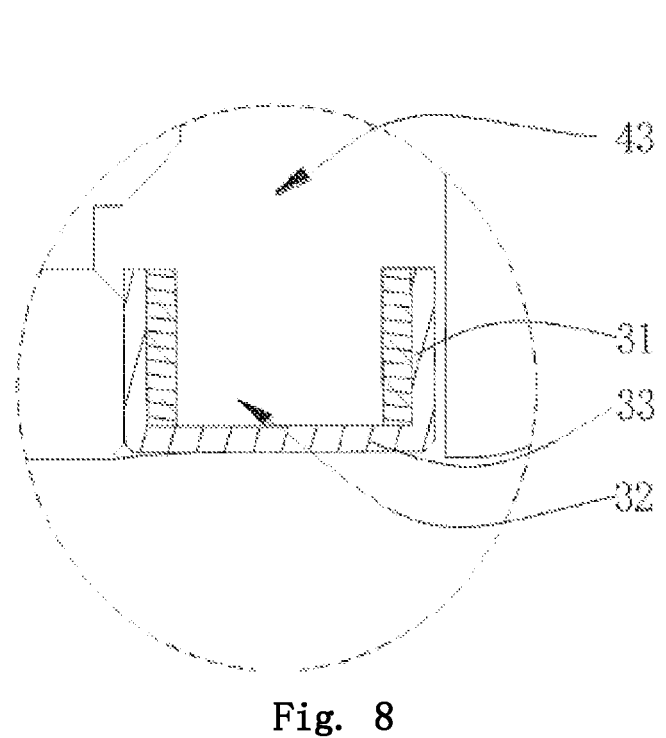
FIG. 8 is an enlarged structural schematic diagram of part C of the sound-producing glasses temple structure illustrated in FIG. 6.

Referring to FIGS. 6 and 8, the sealing cover 3 includes a body portion 31 and a waterproof net 33, a sound-producing front cavity 74 is formed between the diaphragm 71 of the sound-producing device 7 and the inner wall 11, the body portion 31 is provided with a sound outlet 32 communicated with the sound-producing front cavity 74, and the waterproof net 33 is plugged at the sound outlet 32. The preparation of the sealing cover 3 and the preparation of the glasses temple housing 1 can be carried out at the same time. The sound outlet 32 is provided on the sealing cover 3, and since the structure of the sealing cover 3 is simpler than that of the glasses temple housing 1, there is no need to perform the processing of the waterproof net 33 on the glasses temple housing 1, thereby improving the processing efficiency of the glasses temple housing 1. The waterproof net 33 includes an assembly bracket matched with a wall surface of the sound outlet 32 and a mesh disposed to cover the assembly bracket, and the mesh covers the sound outlet 32. The mesh is a waterproof and gas permeability membrane, so that airflow can move to the outside through the mesh, while external water vapor, dust, etc. can be blocked to keep outside the mesh.

Referring to FIGS. 1 and 5 together, a sound-producing rear cavity 72 is formed between a surface for connecting the sound-producing device 7 with the fixing plate 53 and the glasses temple housing 1, the glasses temple housing 1 is further provided with a sound leakage hole 14, the rubber sleeve 51 and/or the fixing plate 53 is provided with an airflow channel communicating the sound leakage hole 14 with the sound-producing rear cavity 72, and/or a gap between the rubber sleeve 51 and the fixing plate 53 forms an airflow channel communicating the sound leakage hole 14 with the sound-producing rear cavity 72. In the present embodiment, there is a gap 52 between the bottom wall 515 of the rubber sleeve 51 and the fixing plate 53, so that air pressure in the sound-producing device 7 can pass through the gap 52, and the airflow channel from the gap 52 to the sound leakage hole 14, and the sound leakage hole 14, so that the air pressure in the sound-producing device 7 keeps consistent with the outside, which contribute to vibrate the diaphragm 71. Of course, the airflow channel may be formed by opening an airflow hole 54 communicated with the interior of the sound-producing device 7 on the fixing plate 53 and the rubber sleeve 51, so that the air pressure inside the sound-producing device 7 is consistent with the outside.

Figure 9:
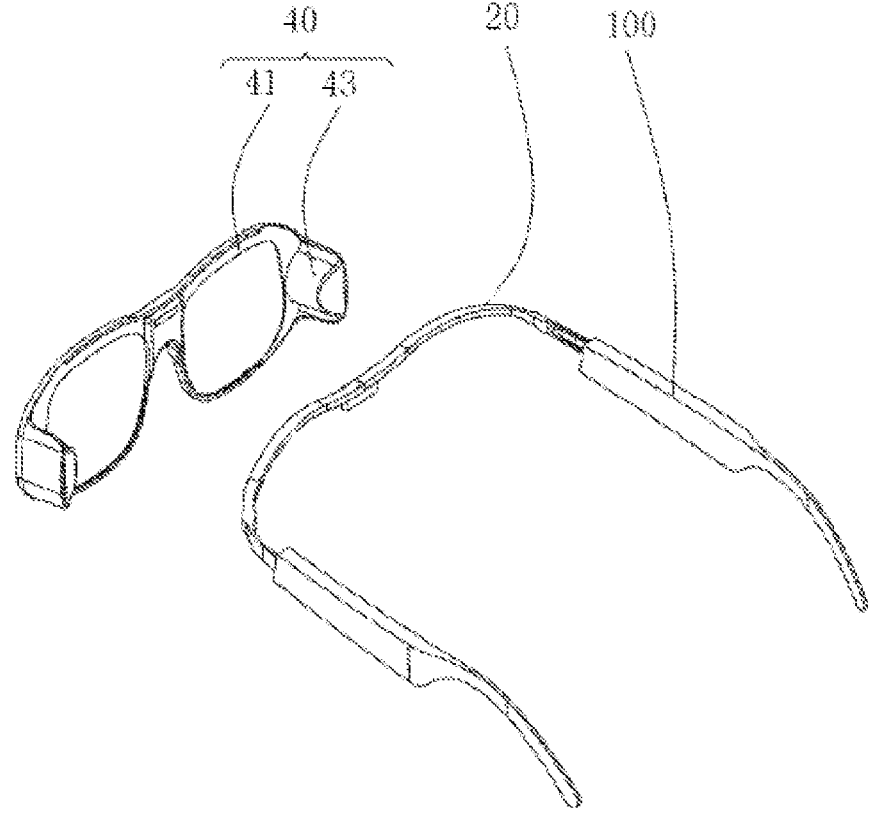
FIG. 9 is a stereoscopic structural diagram of a head-mounted display device according to an embodiment of the present disclosure.

Referring to FIG. 9, the present disclosure also provides a head-mounted display device including a hanger 20 and a display module 40 connected to the hanger 20, both ends of the hanger 20 are provided with the above-mentioned sound-producing glasses temple structure 100; the display module 40 includes a first glasses frame 41 in which a first lens is mounted, and a light engine component 43 mounted on one side or both sides of the first glasses frame 41 and used for transmitting display content to the first lens. The specific structure of the sound-producing glasses temple structure 100 refers to the above-mentioned embodiments. Since the head-mounted display device adopts all the technical solutions of all the above-mentioned embodiments, it at least has all the beneficial effects brought by the technical solutions of the above-mentioned embodiments, and it will not be repeated here.

The light engine component 43 is a self-illuminating active display device. After the light engine component 43 emits light, the light beam is refracted and reflected by a series of optical elements, and is finally displayed in the first lens. Light beams of different colors and brightness constitute the display image. The first lens itself is made of transparent material, so that the user can view the display image generated by the light engine component 43 as well as the real image in the real environment through the lens, thereby realizing the integration of the display image and the real image. In the embodiment shown in FIG. 8, the hanger 20 is a columnar structure, both ends of the hanger 20 are connected with the sound-producing glasses temple structures 100, the display module 40 and the sound-producing glasses temple structure 10 are detachably connected. By disposing the light engine component 43 on one side or both sides of the first glasses frame 41 while the display module 40 is detachably connected to the hanger 20, the relative position relationship between the light engine component 43 and the first glasses frame 41 in the display module 40 may not change with the deformation of the glasses temple structure and the hanger 20, thereby ensuring the accuracy of the display of the display module 40.

In another embodiment, the hanger 20 further includes a second glasses frame (not shown), both ends of the second glasses frame are connected with the sound-producing glasses temple structure 100. The second glasses frame is used for mounting a second lens, and the second lens is a myopia lens, a photosensitive standard color lens, or an electrochromic lens. It will be understood by those skilled in the art that the first lens and the second lens are stacked with each other, so that the user can view variously imaging real images through myopia lens, photosensitive standard color lens, or electrochromic lens. The second glasses frame is fixedly connected or detachably connected to the second lens, and when the second glasses frame is detachably connected to the second lens, the user can decide whether to mount the second lens on the second glasses frame and what kind of second lens to be mounted on the second glasses frame according to the need.

The above are only preferred embodiments of the present disclosure, and thus are not intended to limit the patent scope of the present disclosure. Under the inventive concept of the present disclosure, equivalent structural transformations made by using the description of the present disclosure and the contents of the accompanying drawings, or directly/ indirectly applications used in other relevant technical fields, are all included in the patent protection: scope of the present disclosure.

What is claimed is:

1. A sound-producing glasses temple structure, comprising a glasses temple housing having an accommodating space, and a deformation sleeve and a sound-producing device disposed in the glasses temple housing, wherein the deformation sleeve wraps an outer surface of the sound-producing device, and the deformation sleeve abuts the glasses temple housing and the sound-producing device and is disposed between the glasses temple housing and the sound-producing device, so that the sound-producing device is fixedly suspended in the accommodating space, wherein the deformation sleeve comprises a rubber sleeve and a fixing plate, the rubber sleeve is provided with a first opening and a second opening disposed opposite to each other, the fixing plate is provided at the first opening, the sound-producing device is provided with a diaphragm facing the second opening, and an end of the sound-producing device away from the diaphragm is connected with the fixing plate, wherein the rubber sleeve has two first side walls disposed opposite to each other and two second side walls disposed opposite to each other, the first side walls and the second side walls are connected end to end in sequence to surround and form the first opening and the second opening, and the first side walls and the second side walls wrap a side wall of the sound-producing device, wherein, during an assembly process, the deformation sleeve undergoes certain deformation after pressed by external force from the glasses temple housing to adapt to a structure of the glasses temple housing, so that the sound-producing device is suspended in the accommodating space by the deformation sleeve, and wherein the deformation sleeve deforms to absorb part or all of vibration caused by the sound-producing device, so that the glasses temple housing and other components in the glasses temple housing are not affected by vibration of the sound-producing device.

2. The sound-producing glasses temple structure of claim 1, wherein the glasses temple housing is an integrally molded piece, the glasses temple housing is provided with an assembly opening disposed corresponding to the sound-producing device, and the sound-producing glasses temple structure further comprises a sealing cover disposed to cover the assembly opening.

3. The sound-producing glasses temple structure of claim 1, wherein the sound-producing glasses temple structure further comprises two limiting seats provided inside the glasses temple housing, the two limiting seats are disposed opposite to each other along a long axis direction of the glasses temple housing, the two limiting seats abut against the two second side walls respectively, and the sealing cover is disposed opposite to the first side wall.

4. The sound-producing glasses temple structure of claim 1, wherein the glasses temple housing comprises an inner wall facing a user's head and a bottom wall facing the user's ears, the assembly opening is provided on the bottom wall, and a diaphragm of the sound-producing device is disposed to face the inner wall.

5. The sound-producing glasses temple structure of claim 4, wherein the sealing cover comprises a body portion and a waterproof net, a sound-producing front cavity is formed between the diaphragm of the sound-producing device and the inner wall, the body portion is provided with a sound outlet communicated with the sound-producing front cavity, and the waterproof net is plugged at the sound outlet.

6. The sound-producing glasses temple structure of claim 5, wherein the waterproof net comprises an assembly bracket matched with a wall surface of the sound outlet and a mesh disposed to cover the assembly bracket, and the mesh covers the sound outlet.

7. The sound-producing glasses temple structure of claim 1, wherein a sound-producing rear cavity is formed between a surface for connecting the sound-producing device with the fixing plate and the glasses temple housing, the glasses temple housing is further provided with a sound leakage hole, the rubber sleeve and/or the fixing plate is provided with an airflow channel communicating the sound leakage hole and the sound-producing rear cavity, and/or a gap between the rubber sleeve and the fixing plate forms an airflow channel communicating the sound leakage hole and the sound-producing rear cavity.

8. A head-mounted display device, comprising a hanger and a display module connected to the hanger, both ends of the hanger are provided with the sound-producing glasses temple structure of claim 1, wherein the display module comprises a first glasses frame in which a first lens is mounted, and a light engine component mounted on one side or both sides of the first glasses frame and used for transmitting display content to the first lens.

9. The head-mounted display device of claim 8, wherein the hanger further comprises a second glasses frame, both ends of the second glasses frame are connected to the sound-producing glasses temple structure, a second lens is mounted in the second glasses frame, and the second lens is a myopia lens, a photosensitive standard color lens or an electrochromic lens.

* * * * *